United States Patent [19]

Ezure

[11] E Patent Number: Re. 32,864

[45] Reissued Date of Patent: Feb. 14, 1989

[54] CONNECTOR WITH LOCK MECHANISM

[75] Inventor: Tadayoshi Ezure, Isesaki, Japan

[73] Assignee: Hosiden Electronics Co. Ltd., Osaka, Japan

[21] Appl. No.: 105,153

[22] Filed: Oct. 6, 1987

Related U.S. Patent Documents

Reissue of:

[64] Patent No.: 4,548,455
Issued: Oct. 22, 1985
Appl. No.: 660,680
Filed: Oct. 15, 1984

[30] Foreign Application Priority Data

Oct. 24, 1983 [JP] Japan ..... 58-164196[U]

[51] Int. Cl.[4] ..... H01R 13/629

[52] U.S. Cl. ..... 439/152

[58] Field of Search ..... 385/86, 315, 316; 439/152, 153, 345, 350–358

[56] References Cited

U.S. PATENT DOCUMENTS

| | | | |
|---|---|---|---|
| 3,745,514 | 7/1973 | Brishka | 439/352 |
| 4,026,581 | 5/1977 | Pasbrig | 285/316 |
| 4,370,013 | 1/1983 | Niitsu et al. | 439/352 |

FOREIGN PATENT DOCUMENTS

| | | | |
|---|---|---|---|
| 1590655 | 5/1970 | Fed. Rep. of Germany . | |
| 2063258 | 7/1971 | Fed. Rep. of Germany | 339/91 R |
| 2165037 | 7/1973 | Fed. Rep. of Germany . | |
| 1355766 | 12/1964 | France . | |
| 1455850 | 10/1966 | France | 285/316 |
| 1525556 | 5/1968 | France . | |
| 2447105 | 8/1980 | France | 339/91 R |
| 50-31909 | 9/1975 | Japan . | |
| 53-110489 | 9/1978 | Japan . | |
| 53-159594 | 12/1978 | Japan . | |
| 54-144090 | 10/1979 | Japan . | |
| 57-17750 | 4/1982 | Japan . | |
| 57-22393 | 5/1982 | Japan . | |
| 57-145288 | 9/1982 | Japan . | |

*Primary Examiner*—Joseph H. McGlynn
*Attorney, Agent, or Firm*—Pollock, Vande Sande and Priddy

[57] ABSTRACT

Locking springs project from a plug body, and support bars are axially movably held against the locking springs. The support bars axially engage a coupling sleeve through engagement members. With the support bars in engagement with the coupling sleeve, the support bars are urged to move in a forward direction under the bias of a coil spring. When a plug is to be coupled to a socket, the support bars are caught by a front surface of a socket body, allowing the locking springs to be inserted into an insertion slot in the socket body. When protrusions on the locking springs are inserted in recesses in the insertion slot, the support bars are urged by the coil spring to be inserted into the insertion slot, and the protrusions axially engage in the recesses, whereupon the plug and the socket are locked together. When the coupling sleeve is pulled back against the bias of the coil spring, the support bars are withdrawn out of the insertion slot to allow the plug to be pulled out of the socket.

46 Claims, 7 Drawing Sheets

CONNECTOR WITH LOCK MECHANISM

Matter enclosed in heavy brackets [ ] appears in the original patent but forms no part of this reissue specification; matter printed in italics indicates the additions made by reissue.

BACKGROUND OF THE INVENTION

The present invention relates to a connector for electrically connecting the contacts of a plug and the contacts of a socket by coupling the plug and the socket with each other, and more particularly to a connector having a lock mechanism for locking the plug and the socket together when the plug is inserted in the socket.

One form of the connector of the type described is revealed in Japanese Laid-Open Utility Model Publication No. 53-110489. With the known connector, when a plug and a socket are coupled with each other, a lock mechanism is automatically actuated to lock the plug and the socket together. The plug and the socket are locked against separation even when a cord connected to the connector is caught by a hand or a foot, for example. To disengage the plug and the socket, a coupling sleeve disposed around the plug is pulled back against a biasing force for unlocking the plug and the socket. When coupling the conventional connector, however, it has not been possible to connect the plug and the socket while holding the coupling sleeve. Since the coupling sleeve takes up a relatively large area around the plug, the user is required to hold a relatively small portion such as a cap other than the coupling sleeve, and has to pay attention to do so.

SUMMARY OF THE INVENTION

It is an object of the present invention to provide a connector with a lock mechanism, which includes a plug and a socket that can be coupled together while holding wherever desired on the plug, and which is relatively simple in construction and can be manufactured inexpensively.

According to the present invention, locking springs and support bars extending axially of a plug are disposed in superposed relation, and the support bars are axially movable and normally urged forwardly under the resiliency of a coil spring. When the plug is to be inserted into a socket, the support bars are caught by a front surface of the socket, and the locking springs are first inserted into an insertion slot defined in the front surface of the socket. As protrusions on the ends of the locking springs engage in recesses in the insertion slot in the socket, the support bars are inserted into the insertion slot under the bias of the coil spring, whereupon the protrusions are retained in the recesses to lock the plug and the socket together. The plug can be pulled out of the socket by pulling back a coupling sleeve against the biasing force to withdraw the support bars out of the insertion slot.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
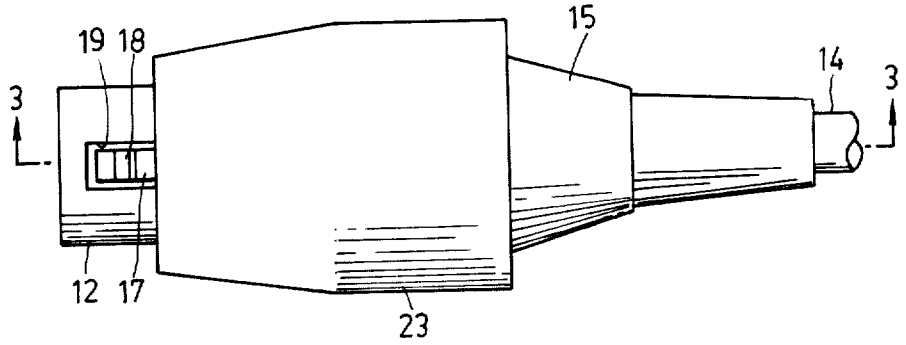
FIG. 1 is a front elevational view of a plug in a connector according to the present invention.
Figure 2:
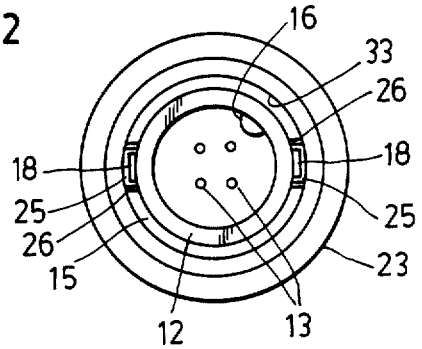
FIG. 2 is a [side] *front* elevational view of the plug shown in FIG. 1.
Figure 3:
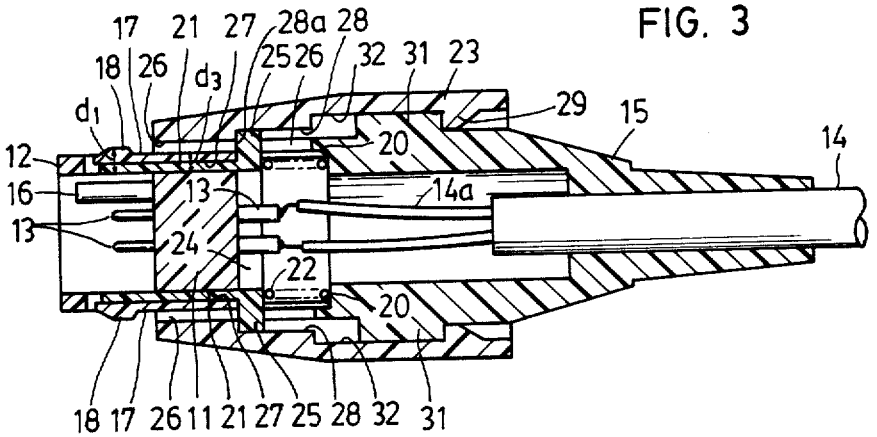
FIG. 3 is a cross-sectional view taken along line 3—3 of FIG. 1.

A plug in a connector according to an embodiment of the present invention is shown in FIGS. 1 through 3. As shown in FIG. 3, a plug body 11 is in the form of a cylinder of an insulating material, and a tubular insert 12 is formed integrally with the plug body 11 and extends coaxially therewith toward a position in front of the plug body 11 (see FIG. 4). Plug contacts 13 projects forwardly from the plug body 11 in the tubular insert 12. The plug contacts 13 comprise pin contacts force-fitted in and extending through small holes (not shown) defined axially through the plug body 11. The contacts 13 have rear ends to which are connected lead wires 14a from a cord 14. The plug body 11 is fitted at its rear end in a front end of a cap 15, with the cord 14 lead out of a rear end of the cap 15. As illustrated in FIGS. 2 and 3, a positioning ridge 16 is integrally formed on an inner peripheral surface of the tubular insert 12 and extends axially thereof.

Figure 4:
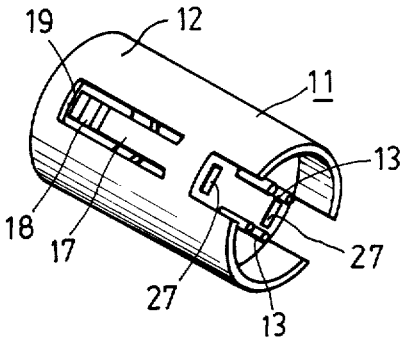
FIG. 4 is a perspective view of a socket body.

According to the present invention, locking springs 17 extending axially forwardly are mounted on the plug body 11 and have on free ends thereof protrusions 18 projecting radially outwardly of an axis of the plug body 11. The locking springs 17 are resiliently displaceable in radial directions. As shown in FIGS. 1 and 4, U-shaped slots 19 are formed in the insert 12 to axially extend into the plug body 11 to define the locking springs 17. The locking springs 17 have rear ends integrally fixed to the plug body 11 and free front ends from which the protrusions 18 integrally project. In the illustrated embodiment, the locking springs 17 are disposed in diametrically opposite relation to each other.

Figure 5:
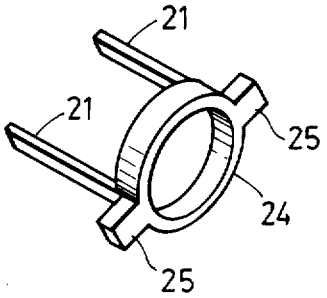
FIG. 5 is a perspective view of support bars.

As illustrated in FIG. 3, a pair of support bars 21 [is] *are* held against surfaces of the locking springs 17 opposite from the protrusions 18 and [is] *are* axially movable. The support bars 21 are normally urged by a coil spring 22 to move axially in a forward direction, and can be moved back by a coupling sleeve 23 against the resiliency of the coil spring 22. The coupling sleeve 23 is axially movably disposed around the plug body 11 and the cap 15. As shown in FIG. 5, the support bars 21 have rear ends integrally connected by a ring member 24 on which there is integrally formed a pair of engagement members 25 extending radially outwardly.

Figure 6:
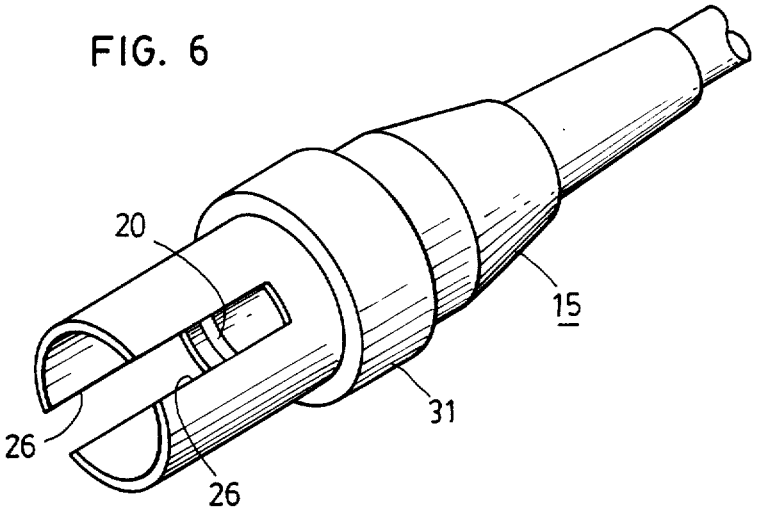
FIG. 6 is a perspective view of a cap.
Figure 7:
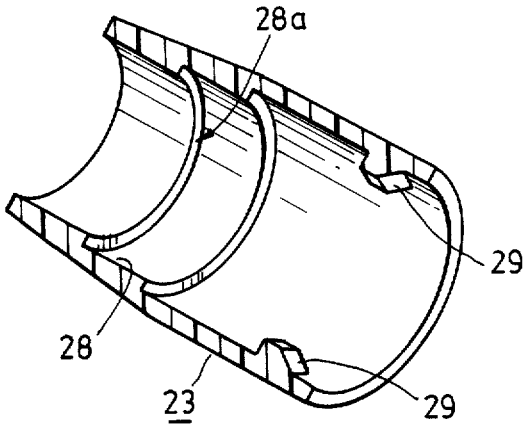
FIG. 7 is a perspective view of a half body of a coupling sleeve.

As illustrated in FIGS. 2, 3, and 6, the cap 15 [have] *has* axial guide slots 26 defined in a front portion thereof in radial alignment with the engagement members 25. The engagement members 25 are guided in the axial guide slots 26 for axial movement therealong, with the engagement members 25 projecting radially outwardly from the guide slots 26. As shown in FIG. 4, the plug body 11 has axial holes 27 positioned radially inwardly of the locking springs 17 and having substantially the same widths as those of the U-shaped slots 19, the axial holes 27 communicating with the slots 19 and the interior of the tubular insert 12. As shown in FIG. 3, the support bars 21 are inserted in the holes 27 and held substantially in contact with inner surfaces of the locking springs 17. The support bars 21 have inner surfaces lying flush with or slightly recessed from the inner peripheral surface of the insert 12. As shown in FIGS. 3 and 7, the coupling sleeve 23 has a ring-shaped recess 28 defined in an inner peripheral surface thereof in which ends of the engagement members 25 are inserted so as to be axially movable. The coupling sleeve 23 also has locking teeth 29 projecting radially inwardly from the inner peripheral surface of the coupling sleeve 23 at a rear end thereof. Between the locking teeth 29 and the ring-shaped recess 28, there is positioned a ring-shaped stopper 31 (FIG. 6) integrally formed on an outer peripheral surface of the cap 15. That is, a portion of the coupling sleeve 23 which is rearward of the ring-shaped recess 28 has a greater inside diameter to define a ring-shaped clearance 32 for allowing the coupling sleeve 23 to be axially moved between the locking teeth 29 and the ring-shaped recess 28.

The coil spring 22 is interposed between a ring-shaped step 20 formed in an inner peripheral surface of the cap 15 and the engagement members 25 in coaxial relation to the cap 15. The coil spring 22 urges the support bars 21 in a forward direction, and also urges the engagement members 25 to engage a front wall surface 28a of the ring-shaped recess 28 to thereby bias the coupling sleeve 23 forwardly. Under this condition, the locking teeth 29 are in engagement with the stopper 31.

In the illustrated position, the protrusions 18 of the locking springs 17 are positioned forwardly of the coupling sleeve 23 and project radially outwardly beyond the outer peripheral surface of the insert 12. The locking springs 17 project slightly forwardly of the support bars 21.

Figure 8:
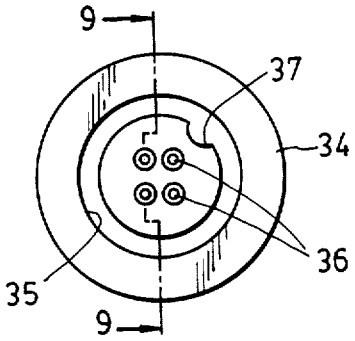
FIG. 8 is a front elevational view of a socket in the connector invention.
Figure 9:
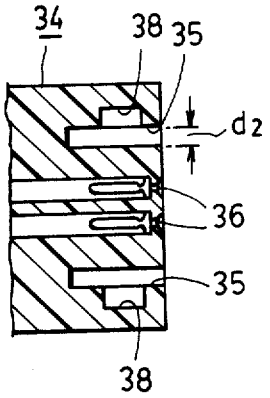
FIG. 9 is a cross-sectional view taken along line 9—9 of FIG. 8.

A socket for use with the plug shown in FIGS. 1 through 7 is illustrated by way of example in FIGS. 8 and 9. A socket body 34 is in the form of a cylinder made of an insulating material and has a ring-shaped insertion slot 35 defined in a front surface thereof. Contacts 36 are mounted in the socket body 34 radially inwardly of the slot 35. The socket contacts 36 are capable of coupling engagement with the plug contacts 13. In the illustrated embodiment, the socket contacts 36 are in the form of receptacle contacts in which the pin contacts 13 can be inserted. The socket contacts 36 are force-fitted in holes defined in the socket body 34. The socket body 34 includes an axial positioning groove 37 defined in an inner peripheral surface of the insertion slot 35 for receiving the positioning ridge 16 in the plug (FIGS. 2 and 3).

The socket body 34 also includes locking recesses 38 defined in an outer peripheral surface of the insertion slot 35 for receiving the protrusions 18 of the locking springs 17. In FIG. 3, the sum $d_1$ of the thicknesses of the protrusion 18 and the locking spring 17 and the thickness of the support bar 21 is greater than the width $d_2$ (FIG. 9) of the insertion slot 35. The width $d_2$ of the insertion slot 35 is greater than the sum $d_3$ of the thickness of the locking spring 17 behind the protrusion 18 and the thickness of the support bar 21. The axial length of the ring-shaped clearance 32 is selected such that, with the protrusions 18 engaging in the recesses 38, the support bars 21 can move into and out of the insertion slot 35 or be axially displaced.

Each of the protrusions 18 has a front taper 18a (FIG. 10A) sloping down from the top of the protrusion towards the tip end of the locking spring 17 to submerge under the level of the outer peripheral surface of the tubular insert 12 so that when the tubular insert 12 is inserted into the insertion slot 35, an outer edge of the slot 35 abuts the front taper 18a to displace the free end portion of the locking spring 17 radially inwardly.

Figure 10A:
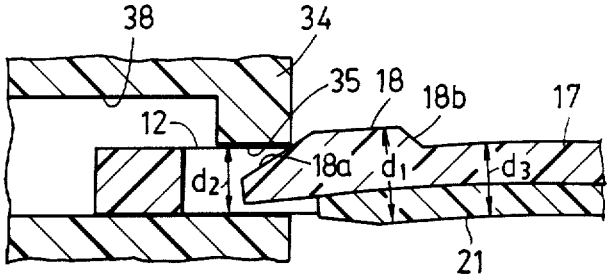
FIGS. 10A through 10D are fragmentary cross-sectional views showing the relationship between a locking spring, a protrusion, a support bar, an insertion slot, and a recess at the time the plug is inserted into and removed from the socket.
Figure 10B:
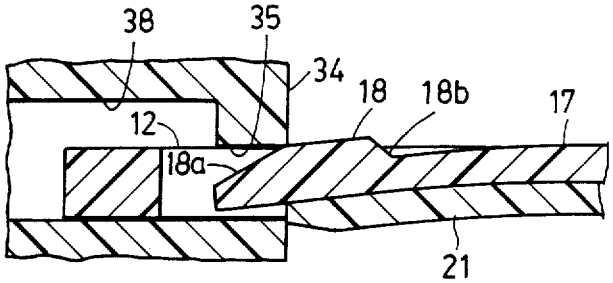
Figure 10C:
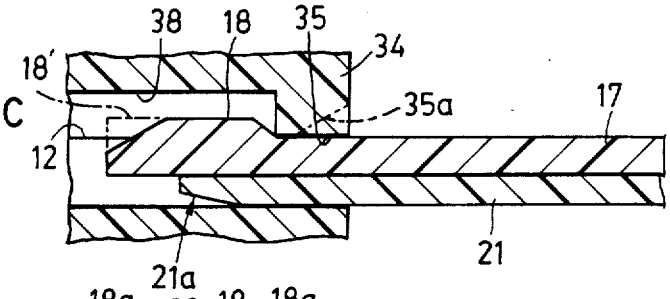

Instead of providing the front taper 18a at the front end of the protrusion 18, it is also possible to form a taper 35a at the outer edge of the insertion slot 35 as indicated by broken line in FIG. 10C. In this case, the front end of the protrusion 18 is right-angled as indicated by broken line 18'.

Figure 10D:
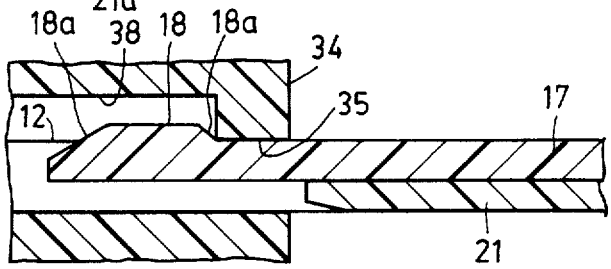

The protrusion 18 may also have a rear taper 18b at the rear end thereof, which effects to press the locking spring 17 radially inwardly as the locking spring 17 is pulled out of the insertion slot 35 (FIG. 10D). Instead of providing the rear taper 18b at the rear end of the protrusion 18, it is also possible to form a taper at an inner edge of the insertion slot 35, though not shown in the drawings.

For coupling the plug and the socket, the tubular insert 12 of the plug is inserted into the insertion slot 35 in the socket. When a front portion of the insert 12 extending forward beyond the free end of the locking spring 17 is inserted into the insertion slot 35, relative positioning between the insertion slot 35 and the free end of the locking spring 17 is automatically accomplished so that the outer edge of the insertion slot 35 may abut the front taper 18a of the protrusion 18. Accordingly, the ends of the protrusions 18 are guided into the insertion slot 35 as shown in FIG. 10A. Since the thickness $d_1$ of the protrusion 18 and the support bar 21 is greater than the slot width $d_2$, as described above, the support bar 21 engages the front surface of the socket body 34 as shown in FIG. 10B and is retracted relatively to the protrusion 18 against the resiliency of the coil spring 22. The protrusions 18 and the insert 12 enter the insertion slot 35 while causing the locking springs 17 to be resiliently bent radially inwardly. When the protrusions 18 are brought into confronting relation to the recesses 38, the protrusions 18 enter and engage axially in the recesses 38 since the locking springs 17 spring back. At the time the locking springs 17 are resiliently bent, the support bars 21 are also resiliently bent as shown in FIG. 10B. Upon entrance of the protrusions 18 into the recesses 38, the support bars 21 spring back and are inserted into the insertion slot 35 under the force of the coil spring 22. To facilitate easy insertion of the support bars 21 into the insertion slot 35, it is preferable for each support bar 21 to have a tapered surface 21a on the distal end thereof. With the plug and the socket thus coupled, they are securely locked and cannot be separated merely by pulling the plug in a direction out of the socket since the protrusions 18 cannot be pulled out of the recesses 38 as the thickness of the locking spring 17 and the support bar 21 and the insertion slot width $d_2$ are selected as described above.

To pull the plug out of the socket, the coupling sleeve 23 is pulled back against the biasing force of the coil spring 22. The support bars 21 are then pulled back through the engagement members 25 until the support bars 21 are brought out of the insertion slot 35 as shown in FIG. 10D. Therefore, the ends of the locking springs 17 can be moved in a direction opposite from the protrusions 18. By pulling the plug axially, the locking springs 17 are resiliently bent as the protrusions 18 are moved out of the recesses 38, whereupon the plug is unlocked from the socket.

Figure 11:
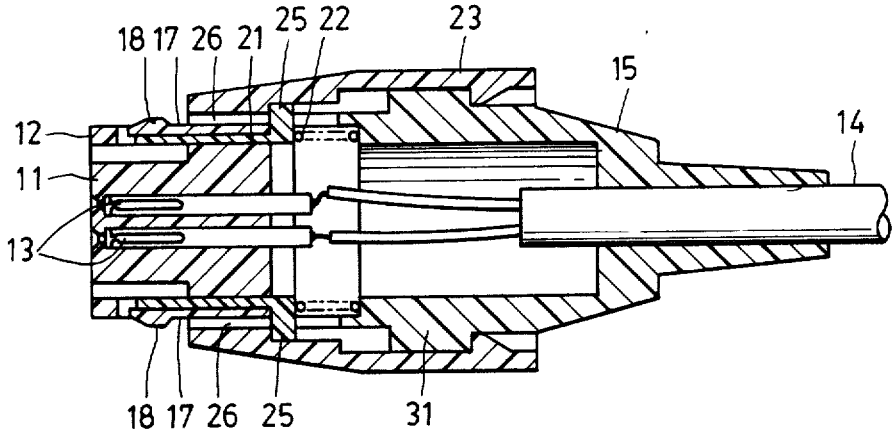
FIG. 11 is a cross-sectional view of a plug according to another embodiment.
Figure 12:
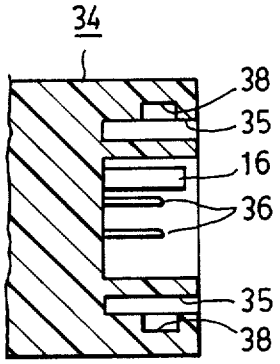
FIG. 12 is a cross-sectional view of a socket according to another embodiment.
Figure 13:
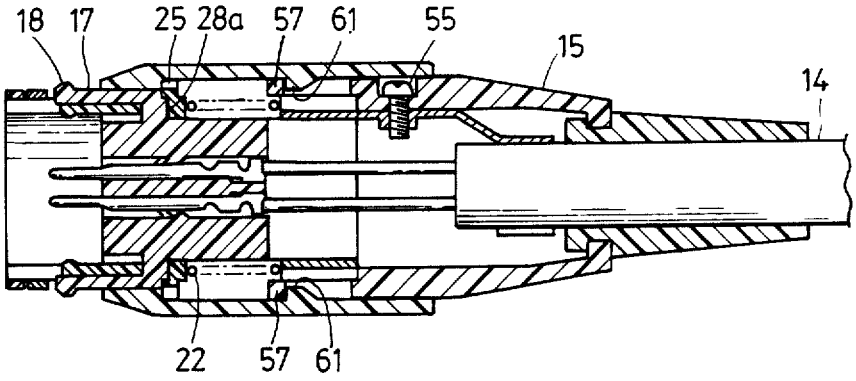
FIG. 13 is a cross-sectional view of a plug according to still another embodiment.
Figure 15:
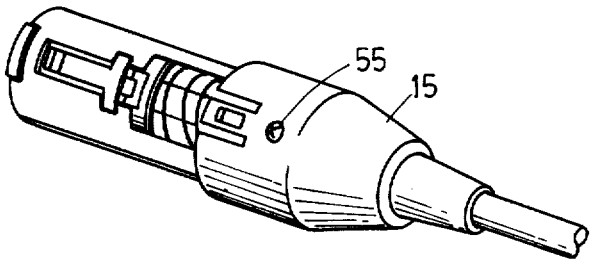
FIG. 15 is a perspective view of the plug of FIG. 13, with the coupling sleeve removed.

With the connector of the invention being thus constructed, when the plug is to be inserted into the socket while holding the coupling sleeve 23, the force imposed on the coupling sleeve 23 is applied through the locking teeth 29 to the cap 15. Thus, the plug can be inserted into the socket. The plug can also be inserted into the socket while holding wherever desired on the cap 15. The plug can easily assembled by attaching the contacts 13 to the plug body 11, inserting the support bars 21 through the holes 27 from behind the plug body 11, connecting the cord 14 to the contacts 13, fitting the plug body 11 into the cap 15 with the coil spring 22 housed therein, and then mounting the coupling sleeve 23 onto the plug body 11 and the cap 15 from the front ends thereof. The plug can be constructed of relatively simple parts with ease. Although the locking springs 17 are shown as integral with the plug body 11, the locking springs 17 may be integrally formed with the cap 15. The locking springs 17 may be positioned radially inwardly of the support bars 21, with the protrusions 18 disposed radially inwardly, and the recesses 38 defined in the inner peripheral surface of the insertion slot 35. As shown in FIGS. 11 and 12 in which like parts are denoted by like reference characters in FIGS. 1 through 9, the plug contacts 13 in the plug body 11 may comprise receptacle contacts, and the socket contacts 36 in the socket body 34 may comprise pin contacts. The locking spring 17 and the support bar 21 may be combined in one pair or three or more pairs.

FIGS. 13 through 16 illustrate a plug in a connector according to another embodiment of the present invention. Like or corresponding parts in FIGS. 13 through 16 are designated by like or corresponding reference characters in FIGS. 1 through 9. The plug body 11 is fixed to the cap 15 by auxiliary members. More specifically, the plug body 11 includes an extension 11a projecting rearwardly of the proximal ends of the locking springs 17, and such a rearward extension 11a has an outside diameter smaller than that of the plug body 11, thus defining a ring-shaped step 41. A ring member 24 is disposed over the rearward extension 11a and a coil spring 22 is also disposed over the rearward extension 11a. The locking springs 17 project radially outwardly of the outer peripheral surface of the plug body 11, and have integral positioning projections 42, 43 projecting away from each other on the proximal ends of the locking springs 17. An edge of the tubular insert 12 comprises projections 44 projecting radially outwardly from the outer peripheral surface of the tubular insert 12.

Semicylindrical metal members 45, 46 serve as auxiliary members for fixing the plug body 11 to the cap 15, and are mounted on the plug body 11 in [surrouding] *surrounding* relation to the outer peripheral surface thereof. Each of the semicylindrical metal members 45, 46 has an opening 47 radially aligned with the locking spring 17, recesses 48, 49 communicating with the opening 47 and aligned with the positioning projections 42, 43, and a recess 51 aligned with the projection 44. The projections 42, 43, 44 are fitted respectively in the recesses 48, 49, 51 to position the metal members 45, 46 on the plug body 11. The metal members 45, 46 extend rearwardly of the plug body 11, and one of the metal members 45 includes an arm 52 extending rearwardly. The rearwardly extending arm 52 is inserted into the cap 15 along an inner surface thereof: The arm 52 has a threaded hole 53. A screw 55 extends through a small hole 54 in the cap 15 threaded into the threaded hole 53, thus fastening the metal member 45 to the cap 15.

Figure 16:
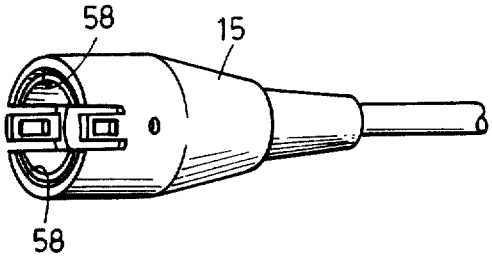
FIG. 16 is a perspective view of a cap of the plug of FIG. 13.
Figure 14:
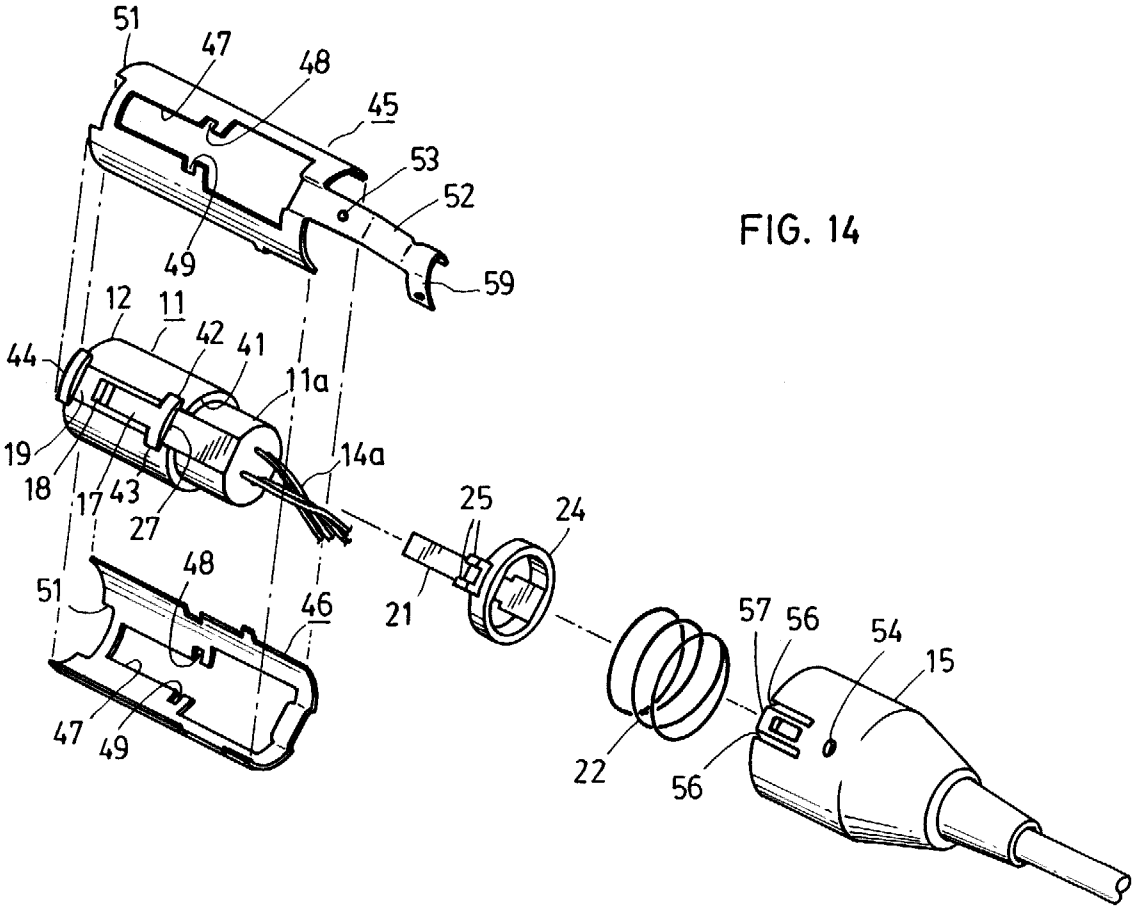
FIG. 14 is an exploded perspective view of the plug shown in FIG. 13, with a coupling sleeve omitted from illustration.

The cap 15 has two pairs of recesses 56 defined in diametrically opposite front portions thereof. Between the recesses 56 of each pair is formed a tongue in which there is defined a rectangular hole, the tongue with the rectangular hole serving as a holder 57. Thus, there are two such holders 57 on the cap 15 in diametrically opposite relation to each other. As shown in FIG. 16, each of the holders 57 is a double-walled construction having an arcuate groove 58 therein. The rear ends of the metal members 45, 46 are fitted into the arcuate grooves 58, respectively. The coil spring 22 is pushed forwardly by a front end surface of the cap 15. The arm 52 has an end serving as a cross-sectionally U-shaped lead-wire holder 59 which holds a plurality of lead wires 14a connected to plug contacts, so that no strong forces will be applied to joints between the lead wires 14a and the contacts when the cord 14 is strongly pulled. The coupling sleeve 23 has on an inner surface thereof projections 61 in the shape of a right-angled triangle. When the front end of the cap 15 is inserted into the coupling sleeve 23, the holders 57 are first elastically deformed radially inwardly and then the projections 61 are snapped into the rectangular holes in the holders 57. Therefore, the coupling sleeve 23 is axially movably mounted on the cap 15.

Although certain preferred embodiments have been shown and described, it should be understood that many changes and modifications may be made therein without departing from the scope of the appended claims.

What is claimed is:

1. A connector with a lock mechanism, comprising:

(a) a *plug having a* plug body of an insulating material;

(b) at least one plug contact mounted on said plug body;

(c) a cap mounted on a rear portion of said plug body;

(d) a coupling sleeve disposed coaxially around said cap and said plug body and axially movable;

(e) at least one locking spring supported on said plug body and projecting forwardly thereof, said locking spring having on a front end thereof a protrusion projecting radially outwardly or inwardly with respect to an axis of said plug body, said locking spring being resiliently displaceable in a direction opposite to the direction in which said protrusion projects;

(f) at least one support bar held against said locking spring on a side opposite from said protrusion [and], *said support bar being formed separately from said coupling sleeve and being* axially movable *relative to said coupling sleeve;*

(g) an engagement member connected to a rear end of said support bar and axially engaging said coupling sleeve, said engagement member being axially movable *relative to said coupling sleeve;*

(h) a coil spring for normally urging said engagement member and said coupling sleeve in a forward direction;

(i) a socket body of an insulating material, *said socket body being connectable to said plug when said plug is grasped by the hand of a user at any desired portion of said cap or coupling sleeve;*

(j) at least one socket contact mounted on said socket body and electrically connectable to said plug contact;

(k) said socket body having an insertion slot defined in a front surface thereof for receiving said locking spring and said support bar, said insertion slot having a width smaller than the sum of the thickness of said locking spring including said protrusion and the thickness of said support bar and larger than the sum of the thickness of said locking spring other than said protrusion and the thickness of said support bar; and (l) said socket body having a recess defined in said insertion slot and axially engageable with said protrusion when said locking spring and said support bar are inserted into said insertion slot.

2. A connector according to claim 1, including a tubular insert integrally formed coaxially with a front end of said plug body and projecting axially beyond said coupling sleeve, said locking spring and said support bar being positioned substantially within a wall thickness of said tubular insert, said protrusion projecting radially beyond an inner peripheral surface or an outer peripheral surface of said tubular insert, said insertion slot in said socket body being receptive of said tubular insert.

3. A connector according to claim 2, including a pair of locking springs disposed in diametrically opposite relation to each other with respect to said axis and a pair of support bars disposed in diametrically opposite relation to each other with respect to said axis.

4. A connector according to claim 3, wherein said pair of support bars have rear ends integrally connected to a ring member, said coil spring having one end pressed against a rear surface of said ring member.

5. A connector according to claim 4, wherein said locking springs are integrally formed with said plug body.

6. A connector according to claim 5, wherein each of said locking springs is defined by a U-shaped slot defined in and extending axially across said tubular insert and said plug body.

7. A connector according to claim 6, wherein said plug body has through holes extending from a rear surface thereof in communication with said U-shaped slots and aligned with said locking springs, respectively, said support bars being inserted in said through holes, respectively.

8. A connector [accoridng] *according* to claim 4, 5, 6, or 7, wherein said engagement member projects radially outwardly integrally from said ring member, said coupling sleeve having an axial step formed on an inner surface thereof, said engagement member being positioned on the side of a rear surface of said axial step, said engagement member and said coupling sleeve being engageable with each other only when said engagement member moves in a forward direction or said coupling sleeve moves in a rearward direction.

9. A connector according to claim 8, wherein said plug body has a rear end fitted in said cap, said coil spring being disposed within said cap and interposed between a ring-shaped step in said cap and said ring member.

10. A connector according to claim 8, including a rear extension integral with a rear surface of said plug body and smaller in outside diameter than said plug body, said ring member being disposed on said rear extension for movement therealong, said coil spring being disposed on said rear extension.

11. A connector according to claim 10, including a cylindrical auxiliary body disposed around said plug body and having an extension extending rearwardly of said plug body and inserted in arcuate grooves defined in a front surface of said cap, said coil spring being interposed between said front surface of said cap and said ring member.

12. A connector according to claim 11, wherein said cylindrical auxiliary body is composed of semicylindrical members and positioned by engagement with projections on an outer peripheral surface of said plug body.

*13. A connector plug comprising:*

*(a) a tubular insert;*

*(b) a contact support body of an insulating material disposed radially inside of said tubular insert, said contact support body and said tubular insert being fixed to each other and defining, in combination, a plug body;*

*(c) at least one plug contact mounted on said contact support body;*

*(d) a cap mounted on a rear portion of said plug body;*

*(e) a coupling sleeve disposed coaxially around said plug body so as to be axially movable relative thereto, said coupling sleeve having an axial step formed on an inner surface thereof;*

*(f) locking spring means supported at a rear end thereof on said plug body and projecting axially forwardly thereof, said locking spring means being resiliently displaceable in a radial direction and having on a front end thereof a protrusion projecting radially with respect to an axis of said plug body;*

*(g) support bar means held against said locking spring means on a side opposite from said protrusion and axially movable in a slidable relation to said locking spring means;*

*(h) an engagement member means extending radially outwardly from a rear end of said support bar means, said engagement member means being positioned on the axially rear side of said axial step of said coupling sleeve so that said engagement member means engages said axial step when said coupling sleeve moves relative to said engagement member means in a rearward direction; and*

(i) a coil spring for normally urging said support bar means in a forward direction so that said engagement member means normally urges said coupling sleeve in a forward direction.

14. A connector plug according to claim 13 wherein a front end of said tubular insert is projected axially beyond said coupling sleeve.

15. A connector plug according to claim 13 wherein said locking spring means comprises a pair of locking springs disposed in a diametrically opposite relation to each other with respect to the axis of said plug body, and said support bar means comprises a pair of support bars disposed in slidable relation to respective ones of said pair of locking springs.

16. A connector plug according to claim 15 wherein said pair of support bars have rear ends integrally connected to a ring member.

17. A connector plug according to claim 13 wherein said locking spring means is integrally formed with said contact support body.

18. A connector plug according to claim 13 wherein said locking spring means is defined by a U-shaped slot formed in said tubular insert.

19. A connector plug according to claim 13 wherein said contact support body has formed therein a through hole extending in the axial direction to axially align with said locking spring means, said support bar means being slidably inserted in said through hole.

20. A connector plug according to claim 13 wherein a rear end of said tubular insert extends axially rearwardly beyond a rear end face of said contact support body to define a rear space, said coil spring being disposed inside of said rear space axially behind said engagement member means.

21. A connector plug according to claim 13 wherein said coil spring is disposed around said plug body axially behind said engagement member means.

22. A connector plug according to claim 21 including a cylindrical member disposed around said plug body, a rear portion of said cylindrical member extending rearwardly beyond a rear end of said plug body and fitted into said cap, whereby said cap is mounted on said plug body via said cylindrical member.

23. A connector plug according to claim 22 wherein said cylindrical member is composed of a pair of semicylindrical members.

24. A connector with a lock mechanism, comprising:

(a) A tubular insert;

(b) a contact support body of an insulating material disposed radially inside of said tubular insert, said contact support body and said tubular insert being fixed to each other and defining, in combination, a plug body;

(c) at least one plug contact mounted on said contact support body;

(d) a cap mounted on a rear portion of said plug body;

(e) a coupling sleeve disposed coaxially around said plug body so as to be axially movable relative thereto, said coupling sleeve having an axial step formed on an inner surface thereof;

(f) locking spring means supported at a rear end thereof on said plug body and projecting axially forwardly thereof, said locking spring means being resiliently displaceable in a radial direction and having on a front end thereof a protrusion projecting radially with respect to an axis of said plug body;

(g) support bar means held against said locking spring means on a side opposite from said protrusion and axially movable in a slidable relation to said locking spring means;

(h) an engagement member means extending radially outwardly from a rear end of said support bar means, said engagement member means being positioned on the axially rear side of said axial step of said coupling sleeve so that said engagement member means engages said axial step when said coupling sleeve moves relative to said engagement member means in a rearward direction;

(i) a coil spring for normally urging said support bar means in a forward direction so that said engagement member means normally urges said coupling sleeve in a forward direction;

(j) a socket body;

(k) at least one socket contact mounted on said socket body and electrically connectable to said plug contact;

(l) an insertion slot defined in a front surface of said socket body to extend in an axial direction of said socket body, for receiving therein said locking spring means and said support bar means, said insertion slot having a width smaller than the sum of the thickness of said locking spring means including said protrusion and the thickness of said support bar means and larger than the sum of the thickness of said locking spring means other than said protrusion and the thickness of said support bar means; and (m) a recess defined in said insertion slot and axially engageable with said protrusion when said locking spring means and said support bar means are inserted into said insertion slot.

25. A connector according to claim 24 wherein a front end of said tubular insert is projected axially beyond said coupling sleeve.

26. A connector according to claim 24 wherein said locking spring means comprises a pair of locking springs disposed in diametrically opposite relation to each other with respect to the axis of said plug body, and said support bar means comprises a pair of support bars disposed in slidable relation to respective ones of said pair of locking springs.

27. A connector according to claim 26 wherein said pair of support bars have rear ends integrally connected to a ring member.

28. A connector according to claim 24 wherein said locking spring means is integrally formed with said contact support body.

29. A connector according to claim 24 wherein said locking spring means is defined by a U-shaped slot formed in said tubular insert.

30. A connector according to claim 24 wherein said contact support body has formed therein a through hole extending in the axial direction to axially align with said locking spring means, said support bar means being slidably inserted in said through hole.

31. A connector according to claim 24 wherein a rear end of said tubular insert extends axially rearwardly beyond a rear end face of said contact support body to define a rear space, said coil spring being disposed inside of said rear space axially behind said engagement member means.

32. A connector according to claim 24 wherein said coil spring is disposed around said plug body axially behind said engagement member means.

33. A connector according to claim 32 including a cylindrical member disposed around said plug body, a rear portion of said cylindrical member extending rearwardly beyond a rear end of said plug body and fitted into said

*cap, whereby said cap is mounted on said plug body via said cylindrical member.*

*34. A connector according to claim 33 wherein said cylindrical member is composed of a pair of semicylindrical members.*

*35. A connector plug with a lock mechanism adapted to be connected to a mating socket when the plug is grasped at any desired location thereon by the hand of a user, said plug comprising:*

*(a) a plug body of an insulating material;*

*(b) at least one plug contact mounted on said plug body;*

*(c) a cap mounted on a rear portion of said plug body;*

*(d) a coupling sleeve disposed coaxially around said cap and said plug body and axially movable;*

*(e) at least one locking spring supported on said plug body and projecting forwardly thereof, said locking spring having on a front end thereof a protrusion projecting radially outwardly or inwardly with respect to an axis of said plug body, said locking spring being resiliently displaceable in a direction opposite to the direction in which said protrusion projects;*

*(f) at least one support bar held against said locking spring on a side opposite from said protrusion, said support bar being formed separately from said coupling sleeve and being axially movable relative to said coupling sleeve;*

*(g) an engagement member connected to a rear end of said support bar and axially engaging said coupling sleeve, said engagement member being axially movable relative to said coupling sleeve; and*

*(h) a coil spring for normally urging said engagement member and said coupling sleeve in a forward direction.*

*36. A connector plug according to claim 35 including a tubular insert integrally formed coaxially with a front end of said plug body and projecting axially beyond said coupling sleeve, said locking spring and said support bar being positioned substantially within a wall thickness of said tubular insert, said protrusion projecting radially beyond an inner peripheral surface or an outer peripheral surface of said tubular insert.*

*37. A connector plug according to claim 36 including a pair of locking springs disposed in diametrically opposite relation to each other with respect to said axis and a pair of support bars disposed in diametrically opposite relation to each other with respect to said axis.*

*38. A connector plug according to claim 37 wherein said pair of support bars have rear ends integrally connected to a ring member, said coil spring having one end pressed against a rear surface of said ring member.*

*39. A connector plug according to claim 38 wherein said locking springs are integrally formed with said plug body.*

*40. A connector plug according to claim 39 wherein each of said locking springs is defined by a U-shaped slot defined in and extending axially across said tubular insert and said plug body.*

*41. A connector plug according to claim 40 wherein said plug body has through holes extending from a rear surface thereof in communication with said U-shaped slots and aligned with said locking springs, respectively, said support bars being inserted in said through holes, respectively.*

*42. A connector plug according to claim 38, 39, 40 or 41 wherein said engagement member projects radially outwardly integrally from said ring member, said coupling sleeve having an axial step formed on an inner surface thereof, said engagement member being positioned on the side of a rear surface of said axial step, said engagement member and said coupling sleeve being engageable with each other only when said engagement member moves in a forward direction or said coupling sleeve moves in a rearward direction.*

*43. A connector plug according to claim 42 wherein said plug body has a rear end fitted in said cap, said coil spring being disposed within said cap and interposed between a ring-shaped step in said cap and said ring member.*

*44. A connector plug according to claim 42 including a rear extension integral with a rear surface of said plug body and smaller in outside diameter than said plug body, said ring member being disposed on said ring extension for movement therealong, said coil spring being disposed on said rear extension.*

*45. A connector plug according to claim 44 including a cylindrical auxiliary body disposed around said plug body and having an extension extending rearwardly of said plug body and inserted in arcuate grooves defined in a front surface of said cap, said coil spring being interposed between said front surface of said cap and said ring member.*

*46. A connector plug according to claim 45 wherein said cylindrical auxiliary body is composed of semicylindrical members and positioned by engagement with projections on an outer peripheral surface of said plug body.*

* * * * *